United States Patent [19]

Sherlock

[11] Patent Number: 5,045,038
[45] Date of Patent: Sep. 3, 1991

[54] LIMITED SLIP DIFFERENTIALS

[75] Inventor: John E. Sherlock, Wolverhampton, England

[73] Assignee: GKN Axles Limited, Birmingham, England

[21] Appl. No.: 503,390

[22] Filed: Apr. 2, 1990

[30] Foreign Application Priority Data

Apr. 5, 1989 [GB] United Kingdom ............... 8907665

[51] Int. Cl.$^5$ ............................................. F16H 1/44
[52] U.S. Cl. ................................... 475/235; 475/240
[58] Field of Search ...................... 475/234, 235, 240

[56] References Cited

U.S. PATENT DOCUMENTS

| | | | |
|---|---|---|---|
| 3,313,180 | 4/1967 | Balfour et al. | 475/235 |
| 3,457,807 | 7/1969 | Altmann | 475/240 X |
| 3,489,038 | 1/1970 | Roper | 475/235 X |
| 3,624,717 | 11/1971 | Brubaker | 475/235 |
| 3,742,783 | 7/1973 | Shealy | 475/235 |
| 3,874,250 | 4/1975 | Duer | 475/235 |
| 4,516,443 | 5/1985 | Hamano et al. | 475/235 X |
| 4,612,825 | 9/1986 | Engle | 475/235 |
| 4,719,817 | 1/1988 | Azuma | 475/235 |
| 4,939,953 | 7/1990 | Yasui | 475/235 X |

Primary Examiner—Dwight Diehl
Attorney, Agent, or Firm—Marshall, O'Toole, Gerstein, Murray & Bicknell

[57] ABSTRACT

A limited slip differential, comprising a housing (10), two bevel side gears (15, 16), clutch assemblies (21, 22) disposed between the outermost ends of the side gears and the housing, two bevel planet gears (23, 24), thrust members (32) engaging the side gears, and spring means (37) operating on the thrust members to urge them into engagement with the side gears and cause frictional engagement in the clutch assemblies; wherein the bevel planet gears are rotatably supported on a shaft member (25) which extends transversely through the housing and also through a support member (30) which holds the thrust members (32) against rotation, the shaft member also loading the spring means when it is inserted. The arrangement enables the differential to have a housing in one piece, with a lateral opening or openings through which all parts can be introduced into the housing with assembly being completed by insertion of the planet gear support shaft member to load the spring means and hold the suport member in position.

7 Claims, 3 Drawing Sheets

LIMITED SLIP DIFFERENTIALS

BACKGROUND TO THE INVENTION

Field of the Invention

This invention relates to a limited slip differential, comprising:

a housing rotatable about an axis;

two bevel side gears in said housing at opposite ends thereof, said side gears being arranged for torque transmitting engagement with respective output shafts and being rotatable within the housing about said axis;

respective clutch assemblies disposed between the outermost ends of said side gears and said housing, each clutch assembly comprising at least one member rotationally fast with the associated side gear and at least one member rotationally fast with the housing, said members being frictionally engageable with one another;

two bevel planet gears each meshing with both side gears and supported in said housing for rotation about a planet gear axis perpendicular to said axis;

thrust members engaging said side gears; and spring means operable on said thrust members to urge them and the side gears away from one another to cause said frictional engagement in said clutch assemblies. Such a limited slip differential will hereafter be referred to as a limited slip differential of the kind specified.

In a limited slip differential of the kind specified, the clutch assemblies provide the required slip-limiting properties. The force exerted by the spring means on the thrust members is augmented by the forces which arise between the meshing bevel planet gears and bevel side gears, but the spring means is necessary to ensure that the clutch assemblies are always pre-loaded to some extent. When such a differential is being assembled, the pre-load exerted by the spring means on the clutch assemblies by way of the thrust members and side gears can cause some problems in introducing all the components into the housing in the correct manner.

SUMMARY OF THE INVENTION

It is broadly the object of the present invention to provide a limited slip differential of the kind specified with a simplified construction which facilitates assembly of the differential.

According to the invention, we provide a limited slip differential of the kind specified wherein there is provided a support member for said thrust members and spring means, which holds the thrust members to prevent rotation thereof about said axis, and a shaft member on which said planet gears are supported, said shaft member extending transversely of the housing and through said support member to hold the support member in position, and also to load said spring means to cause the spring means to exert a force on the thrust members.

In a differential according to the invention, when the planet gear-supporting shaft member is not present, the spring means is not loaded and therefore does not exert any force on the thrust members. Therefore, because the spring means is not loaded, it is relatively easy to introduce a sub-assembly of the support member, thrust members and spring means into the housing of the differential between the side gears thereof. Then fitting of the shaft member on which the planet gears are supported loads the spring means to exert the required force on the side gears.

The spring means may comprise at least one Belleville washer disposed between each thrust member and the planet gear-supporting shaft member. Preferably an abutment member is provided between the shaft member and the or each Belleville washer for each thrust member.

The housing of the differential may be of one piece construction, having a lateral opening or openings of sufficient size to enable the side gears and their associated clutch assemblies, the planet gears, and the aforesaid assembly of thrust members, support member, and spring means, to be introduced into the interior of the housing.

BRIEF DESCRIPTION OF THE DRAWINGS

The invention will now be described by way of example with reference to the accompanying drawings, in which.

DESCRIPTION OF PREFERRED EMBODIMENT

Figure 1:
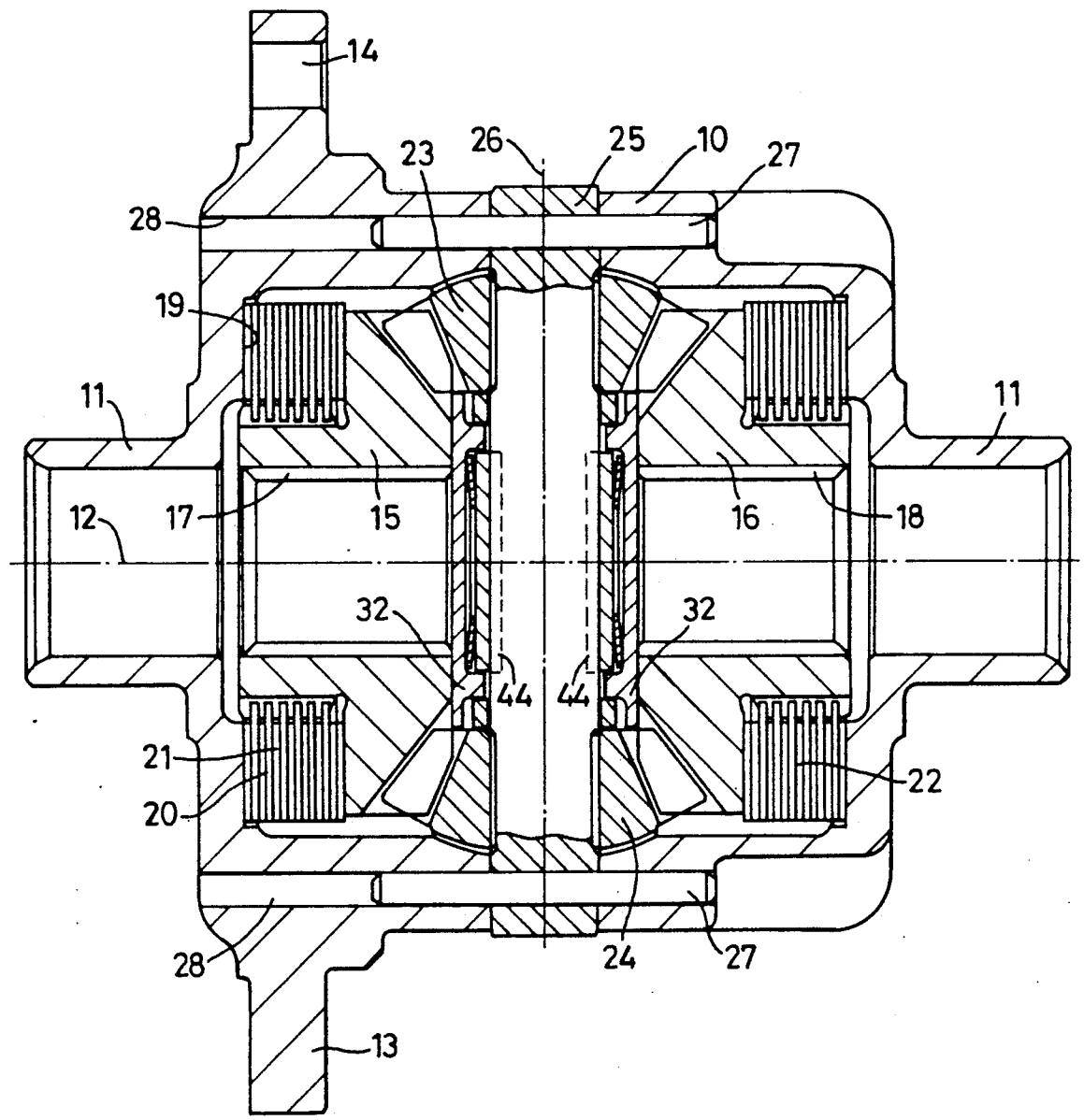
FIG. 1 is a longitudinal section through a limited slip differential according to the invention.

The illustrated differential comprises a housing 10 which is in one piece, having at each end a spigot 11 whereby, with suitable bearings, the housing would be mounted in, for example, an axle casing for rotation about an axis 12. Adjacent one end, the housing 10 has an external flange 13 with circumferentially spaced apertures 14 for attachment by bolts of a crown gear wheel which, in a complete axle, would mesh with an input pinion.

The housing 10 has an enlarged hollow in its interior, within which are disposed two bevel side gears 15, 16. These are supported within the housing so as to be rotatable about the axis 12 relative to the housing. The side gears have respective splined bores 17, 18 for torque transmitting connection to half shafts extending into the housing through the spigots 11. Between opposed flat annular surfaces 19, 20 of the housing 10 and side gear 15 respectively there is interposed a clutch pack 21 of interleaved annular plates which are alternately rotationally fast with the housing and with the side gear, so that when urged into engagement torque can be transmitted between the housing and side gear. A similar clutch pack 22 is disposed between the side gear 16 and the other end of the housing 10.

Two bevel planet gears 23, 24 mesh with the side gears 15, 16. The planet gears are supported on a shaft member 25 which extends transversely across the housing 10, so that the planet gears are rotatable about the axis 26 of the shaft member 25. The shaft member 25 is held in its position in the housing 10 by two roll pins 27 which fit in bores 28 in the housing 10 and extend through apertures 29 in the shaft member 25.

Between the planet gears 23, 24 the shaft member 25 extends through an arrangement most clearly described with reference to FIG. 3 of the drawings. There is a support member 30 which is of annular configuration, having two diametrically opposed apertures 31 through which the shaft member extends. There are two thrust members 32, each of which comprises a flat thrust plate 33, an annular spigot 34 extending therefrom, and two diametrically opposed pegs 35 extending from the spigot 34 in axial continuation thereof. The thrust members 32 fit in back to back relation with their spigots 34 inside the support member 30 and the pegs 35 extending into complementary grooves 36 extending through the support member 30, so that the thrust members 32 cannot rotate about the axis 12 relative to the support member 30 and each other. The thrust members 32 are urged away from one another by respective Belleville spring washers 37 which react against abutment discs 38 which lie against the surface of the shaft member 25.

Figure 2:
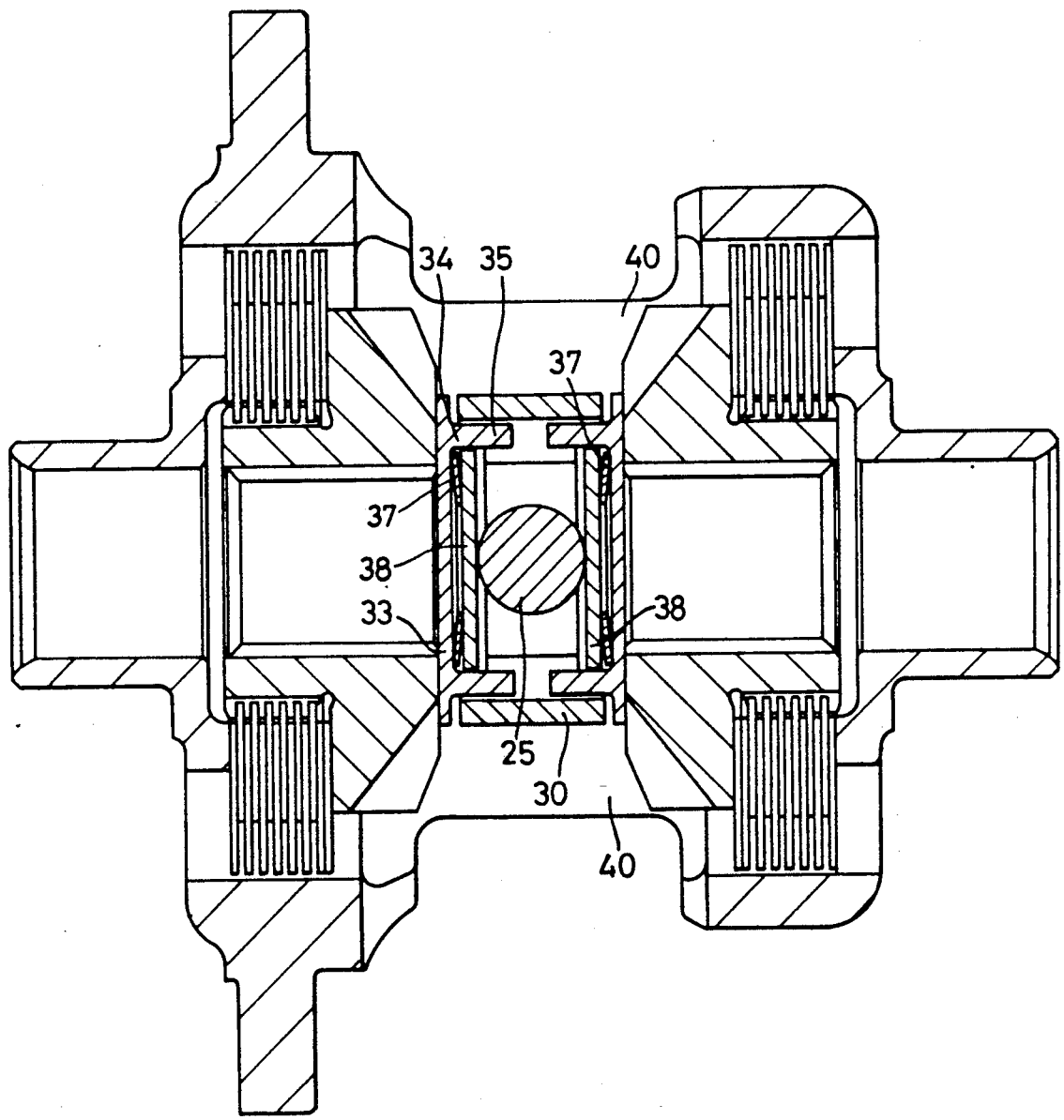
FIG. 2 is a longitudinal section through the differential, but in a plane perpendicular to the section plane of FIG. 1.

To enable the differential as above described to be assembled, the housing 10 is provided with diametrically opposed lateral openings which are seen in the section which is FIG. 2 and indicated at 40. These openings are large enough for each of the side gears and its associated clutch pack to be fitted laterally into the housing and then moved axially into its assembled position therein. Then the assembly of support member 30, thrust members 32, and their associated Belleville washers 37 and abutment discs 38 can be placed into position between the side gears. The dimensions of these parts are such that until the shaft member 25 is in position, the Belleville washers 37 exert no force on the thrust members 32. The abutment discs 38 rest against part-annular stop formations 42 in the interior of the support member 30. When the shaft member 25 is inserted along its axis 26, it contacts the abutment discs 38 and pushes them apart so as to tension the Belleville washers 37. To facilitate such fitting of the shaft member 25, it has frusto-conical lead in surfaces 41 at its ends. When fitted, the shaft member 25 is held in place by the installation of roll pins 27.

When thus assembled, the differential functions in known manner as a limited slip differential. The Belleville washers 37 force the thrust members 32 away from one another and thus the side gears to compress their respective clutch packs, thereby to resist excessive slip of one of the differential outputs relative to the other. Under such conditions, the force exerted on the clutch packs by the Belleville washers is augmented by the separating forces resulting from the nature of the engagement between the bevel side gears and planet gears.

Adjustment of the force exerted on the side gears is readily effected by changing the Belleville washers 37 for ones of different strength or thickness. A number of such washers may be disposed between each abutment disc and thrust member. Abutment discs of different thickness could be used.

In a possible modification, instead of the shaft member 25 being held in position by roll pins 27 it may interfit with a part of the assembly of support member 30 and associated components. For example, abutment discs 38 may engage, under the influence of spring washers 37, with recesses in the shaft member 25. Such recesses may take the form of flats 44 on opposite sides of the shaft member 25, as shown in broken lines in FIGS. 1 and 3 of the drawings. Then, for removal of the shaft member 25, a suitable tool would have to be inserted to disengage the abutment discs from the flats on the shaft member 25 whereafter it can be removed.

Figure 3:
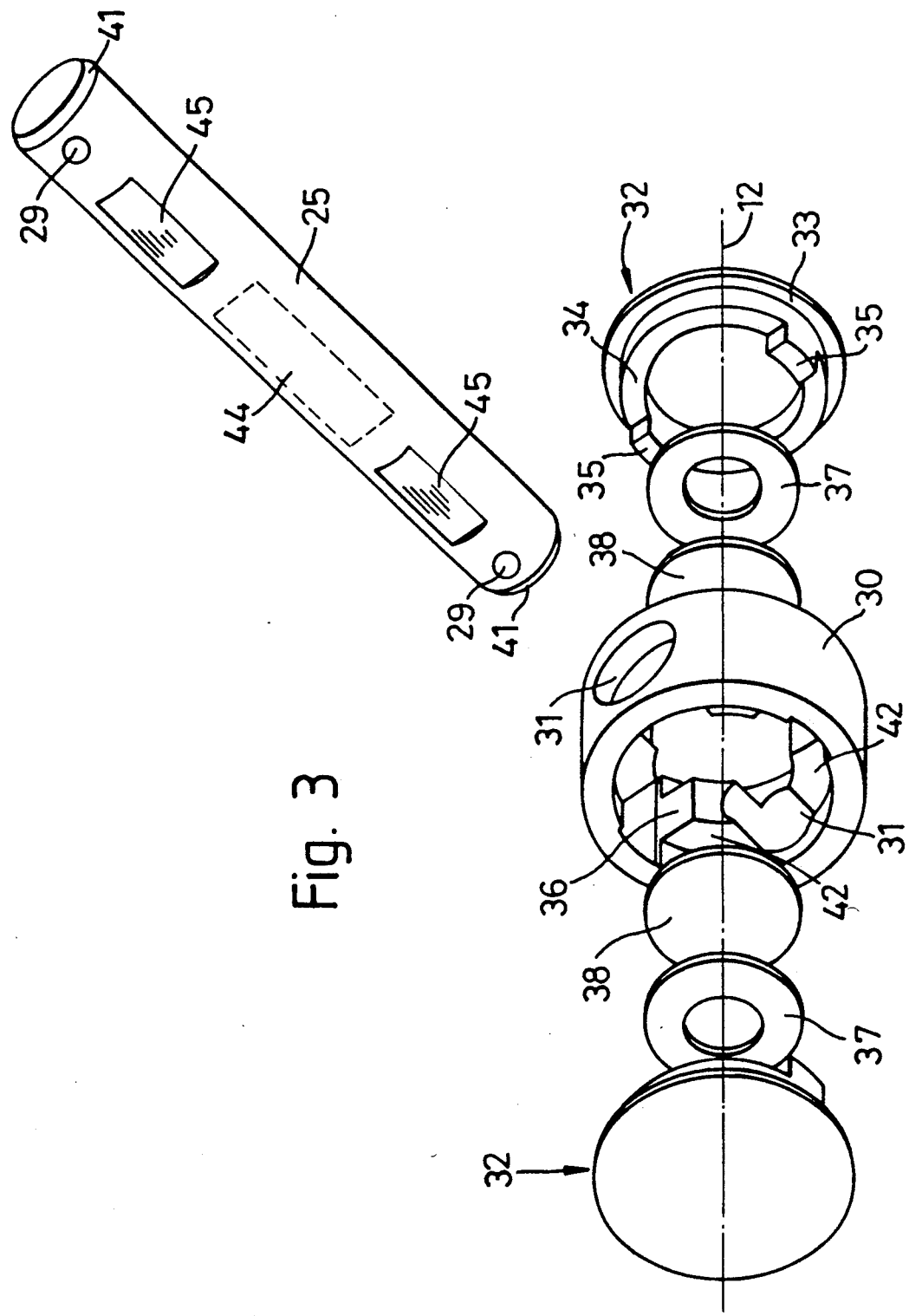
FIG. 3 is an exploded perspective view of part of the differential.

The flats 45 shown on the shaft member 25 in FIG. 3 are to provide for effective lubrication of the bevel planet gears 23, 24 when they rotate about the shaft member.

I claim:

1. A limited slip differential, comprising:

a housing rotatable about an axis;

two bevel side gears in said housing at opposite ends thereof, said side gears being arranged for torque transmitting engagement with respective output shafts and being rotatable within the housing about said axis;

respective clutch assemblies disposed between the outermost ends of said side gears and said housing, each clutch assembly comprising at least one member rotationally fast with the associated side gear and at least one member rotationally fast with the housing, said members being frictionally engageable with one another;

two bevel planet gears each meshing with both side gears and supported in said housing for rotation about a planet gear axis perpendicular to said axis;

thrust members engaging said side gears;

respective spring means operable on said thrust members;

a support member for said thrust members and spring means, said support member holding said thrust members to prevent rotation thereof relative to said housing about said axis; and a shaft member on which said planet gears are supported, said shaft member extending transversely of the housing and through said support member to hold the support member in position reacting against said shaft member whereby said spring means exerts force on said thrust members to urge them and the side gears away from one another to cause said frictional engagement in said clutch assemblies.

2. A differential according to claim 1 wherein the spring means comprises at least one Belleville washer disposed between each thrust member and the planet gear-supporting shaft member.

3. A differential according to claim 2 wherein an abutment member is provided between the planet gear-supporting shaft member and the or each Belleville washer for each thrust member.

4. A differential according to claim 1 wherein the housing is in one piece, and has at least one lateral opening through which the side gears, clutch assemblies, planet gears, support member, thrust members and spring means can be introduced into the interior of the housing.

5. A limited slip differential, comprising:

a housing rotatable about an axis;

two bevel side gears in said housing at opposite ends thereof, said side gears being arranged for torque transmitting engagement with respective output shafts and being rotatable within the housing about said axis;

respective clutch assemblies disposed between the outermost ends of said side gears and said housing, each clutch assembly comprising at least one member rotationally fast with the associated side gear and at least one member rotationally fast with the housing, said members being frictionally engageable with one another;

two bevel planet gears each meshing with both side gears and supported in said housing for rotation about a planet gear axis perpendicular to said axis;

thrust members engaging said side gears;

spring means operable on said thrust members to urge them and the side gears away from one another to cause said frictional engagement in said clutch assemblies;

a support member for said thrust members and spring means, said support member holding said thrust members to prevent rotation thereof relative to said housing about said axis;

the housing being in one piece and having at least one lateral opening through which the side gears, clutch assemblies, planet gears, support member, thrust members and spring means can be introduced into the interior of the housing; and a shaft member on which said planet gears are supported, the planet gear-supporting shaft member being held in position by the spring means, said shaft member extending transversely of the housing and through said support member to hold the support member in position and also to load the spring means to cause the spring means to exert a force on said thrust members.

6. In a limited slip differential:

a housing rotatable about an axis;

two bevel side gears in said housing at opposite ends thereof, said side gears being arranged for torque transmitting engagement with respective output shafts and being rotatable within the housing about said axis;

respective clutch assemblies disposed between the outermost ends of said side gears and said housing, each clutch assembly comprising at least one member rotationally fast with the associated side gear and at lest one member rotationally fast with the housing, said members being frictionally engageable with one another;

two bevel planet gears each meshing with both side gears and supported in said housing for rotation about a planet gear axis perpendicular to said axis;

a sub-assembly comprising thrust members engaging said side gears; respective spring means operable on said thrust members; and a support member for said thrust members and spring means, said support member having means for holding said thrust members to prevent rotation thereof relative to said housing about said axis; and the housing having at least one lateral opening through which the side gears, clutch assemblies, planet gears, and sub-assembly can be introduced into the interior of the housing.

7. In a limited slip differential:

a housing rotatable about an axis;

two bevel side gears in said housing at opposite ends thereof, said side gears being arranged for torque transmitting engagement with respective output shafts and being rotatable within the housing about said axis;

respective clutch assemblies disposed between the outermost ends of said side gears and said housing, each clutch assembly comprising at least one member rotationally fast with the associated side gear and at least one member rotationally fast with the housing, said members being frictionally engageable with one another;

two bevel planet gears each meshing with both side gears;

a sub-assembly comprising thrust members engaging said side gears; respective spring means operable on said thrust members; and a support member for said thrust members and spring means, said support means having means for holding said thrust members to prevent rotation thereof relative to said housing about said axis; and said support member having aperture means for receiving a transverse shaft member for supporting said bevel planet gears in said housing for rotation about a planet gear axis perpendicular to said axis, said spring means having means for reacting against said shaft member.

* * * * *